(12) United States Patent
Pengilly et al.

(10) Patent No.: US 12,130,166 B2
(45) Date of Patent: Oct. 29, 2024

(54) MEASURING LEVELS OF VOLATILE FLUIDS

(71) Applicant: Saudi Arabian Oil Company, Dhahran (SA)

(72) Inventors: Nicholas J. Pengilly, Dhahran (SA); Zied Soua, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/435,489

(22) Filed: Feb. 7, 2024

(65) Prior Publication Data
US 2024/0175740 A1 May 30, 2024

Related U.S. Application Data

(62) Division of application No. 17/473,793, filed on Sep. 13, 2021, now abandoned.

(51) Int. Cl.
*G01F 23/292* (2006.01)
(52) U.S. Cl.
CPC .................................. *G01F 23/292* (2013.01)
(58) Field of Classification Search
CPC ..... G01F 23/185; G01F 23/284; G01F 23/292
USPC ................ 73/290 R, 861.42, 861.49, 861.51
See application file for complete search history.

(56) References Cited

U.S. PATENT DOCUMENTS

| | | |
|---|---|---|
| 448,920 A | 3/1891 | Heller |
| 994,333 A | 6/1911 | Orth et al. |
| 1,077,758 A | 11/1913 | Salter |
| 1,178,836 A | 4/1916 | Best, Sr. |
| 1,511,325 A | 10/1924 | George |
| 1,701,914 A | 2/1929 | George |
| 1,794,295 A | 2/1931 | Huyette |
| 1,880,847 A | 10/1932 | Daly |
| 1,980,003 A * | 11/1934 | Schofield ................ G01F 23/02 73/323 |
| 2,326,448 A | 8/1943 | Eugene |
| 2,591,075 A | 4/1952 | James |
| 3,393,564 A | 7/1968 | Simmons |
| (Continued) | | |

OTHER PUBLICATIONS

Holler et al., "Fill level measurement in a closed vessel by monitoring pressure variations due to thermodynamic equilibrium perturbation," IEEE International Instrumentation and Measurement Technology Conference, Victoria, Vancouver Island, Canada, May 2008, 6 pages.

*Primary Examiner* — John Fitzgerald
(74) *Attorney, Agent, or Firm* — Fish & Richardson P.C.

(57) ABSTRACT

A vertical tubular defines a measurement chamber. A first valve is nearer an upper end of the vertical tubular than a lower end of the vertical tubular. The first valve defines a first actuable passage fluidically connected to the measuring chamber. A second is valve nearer the lower end of the vertical tubular than the upper end of the vertical tubular. The second valve defines a second actuable passage fluidically connected to the measuring chamber. A third valve is vertically aligned with the first valve. The third valve is on an opposite side of the vertical tubular from the first valve. The third valve defines a third actuable passage fluidically connected to the measuring chamber. The fourth valve defines a fourth actuable passage fluidically connected to the measuring chamber. A flange is each end of the vertical tubular.

20 Claims, 5 Drawing Sheets

(56) References Cited

U.S. PATENT DOCUMENTS

| | | |
|---|---|---|
| 3,744,306 A | 7/1973 | Krueger |
| 4,098,119 A | 7/1978 | Coats |
| 4,103,552 A | 8/1978 | Bucchianeri et al. |
| 4,870,862 A | 10/1989 | Bonetti |
| 5,038,611 A | 8/1991 | Weldon et al. |
| 5,052,224 A | 10/1991 | Ford et al. |
| 5,119,676 A | 6/1992 | Bower et al. |
| 5,988,701 A | 11/1999 | Wu |
| 6,067,854 A * | 5/2000 | Yang .................. H01H 36/02 |
| | | 73/313 |
| 6,588,272 B2 | 7/2003 | Mulrooney et al. |
| 6,691,570 B1 | 2/2004 | Neuhaus et al. |
| 7,610,807 B2 | 11/2009 | Skinner |
| 7,843,199 B2 * | 11/2010 | Schulz .................. G01F 23/68 |
| | | 73/306 |
| 7,882,736 B2 | 2/2011 | Schumacher |
| 8,402,822 B2 * | 3/2013 | Hopper .................. G01F 23/62 |
| | | 73/313 |
| 11,988,539 B2 * | 5/2024 | Austerlitz ............... G01F 23/18 |
| 2002/0059828 A1 * | 5/2002 | Muller .................... G01S 15/88 |
| | | 73/290 R |
| 2003/0037613 A1 | 2/2003 | Mulrooney et al. |
| 2008/0098810 A1 | 5/2008 | Skinner |
| 2008/0210003 A1 | 9/2008 | Schulz |
| 2009/0031799 A1 * | 2/2009 | Benway .................. G01F 23/72 |
| | | 73/306 |
| 2009/0056438 A1 | 3/2009 | Hughes et al. |
| 2009/0120181 A1 | 5/2009 | Schumacher |
| 2014/0311588 A1 * | 10/2014 | Wood, Jr. ............... G21C 19/28 |
| | | 137/558 |
| 2017/0370760 A1 * | 12/2017 | Fredriksson ............ H01P 1/042 |
| 2021/0252431 A1 * | 8/2021 | Malone .................. B01D 21/34 |
| 2023/0083033 A1 | 3/2023 | Pengilly et al. |

\* cited by examiner

MEASURING LEVELS OF VOLATILE FLUIDS

CROSS-REFERENCE TO RELATED APPLICATION(S)

This application is a divisional of and claims the benefit of priority to U.S. patent application Ser. No. 17/473,793, filed Sep. 13, 2021, the contents of which are incorporated by reference herein.

TECHNICAL FIELD

This disclosure relates to level measurements within pressure vessels.

BACKGROUND

During fluid processing, it is often useful to know a fluid level within a process vessel. Such knowledge is used to calculate feed-rates, retention times, and other parameters that are needed to maintain smooth processing operations. In some instances, pressure vessels have internal baffles or other geometries that have a narrow operating range of fluid levels as well. A variety of level measurement technologies exist today, such as range finding technologies (for example, guided wave radar and laser range measurements), resistive sensors, and magnetostrictive sensors. Different level sensing technologies are most suited for particular services.

SUMMARY

This disclosure describes technologies relating to measuring levels of volatile fluids.

An example implementation of the subject matter described within this disclosure is a level measurement device with the following features. A vertical tubular defines a measurement chamber. A first valve is nearer an upper end of the vertical tubular than a lower end of the vertical tubular. The first valve defines a first actuable passage fluidically connected to the measuring chamber. A second is valve nearer the lower end of the vertical tubular than the upper end of the vertical tubular. The second valve defines a second actuable passage fluidically connected to the measuring chamber. A third valve is vertically aligned with the first valve. The third valve is on an opposite side of the vertical tubular from the first valve. The third valve defines a third actuable passage fluidically connected to the measuring chamber. A fourth valve is vertically aligned with the second valve. The fourth valve is on an opposite side of the vertical tubular from the second valve. The fourth valve defines a fourth actuable passage fluidically connected to the measuring chamber. A first flange is at an upper end of the vertical tubular. A second flange is at a lower end of the vertical tubular.

Aspects of the example level measurement device, which can be combined with the example measurement device alone or in combination with other aspects, include that following. The first flange or the second flange are blinded.

Aspects of the example level measurement device, which can be combined with the example measurement device alone or in combination with other aspects, include that following. A level measuring device is mounted to the first flange.

Aspects of the example level measurement device, which can be combined with the example measurement device alone or in combination with other aspects, include that following. The level measuring device includes a guided wave radar or laser measurement device.

Aspects of the example level measurement device, which can be combined with the example measurement device alone or in combination with other aspects, include that following. The level measuring device includes a differential pressure sensor.

Aspects of the example level measurement device, which can be combined with the example measurement device alone or in combination with other aspects, include that following. The differential pressure sensor includes two discrete pressure sensors.

Aspects of the example level measurement device, which can be combined with the example measurement device alone or in combination with other aspects, include that following. The vertical tubular includes a corrosion resistant alloy.

An example implementation of the subject matter described within this disclosure is a method with the following features. A first valve, defining a first flow passage fluidically connected to a pressure vessel and a vertical measurement chamber defined by a vertical tubular, is opened. a second valve, defining a second flow passage fluidically connected to a pressure vessel and the vertical measurement chamber, is opened. A volatile fluid is received by the measurement chamber through the first flow passage and the second flow passage. The first valve is closed. The second valve is closed. A duration of time is waited for, or passes, to allow the fluid to stabilize from being volatile. A level of the fluid is measured.

Aspects of the example method, which can be combined with the example method alone or in combination with other aspects, include that following. Prior to opening the first valve, a guided wave radar or laser measurement device is attached to an upper end of the vertical tubular.

Aspects of the example method, which can be combined with the example method alone or in combination with other aspects, include that following. Measuring the level includes using a guided wave radar or a laser measurement device.

Aspects of the example method, which can be combined with the example method alone or in combination with other aspects, include that following. The guided wave radar or a laser measurement device is calibrated.

Aspects of the example method, which can be combined with the example method alone or in combination with other aspects, include that following. Calibrating includes the following features. A third valve, defining a third flow passage fluidically connected to the vertical measurement chamber, is opened. A fourth valve, defining a fourth flow passage fluidically connected to the vertical measurement chamber, is opened. A designated amount of calibration fluid is received by the vertical measurement chamber from the third flow passage or the fourth flow passage. A level of the fluid with the guided wave radar or laser measurement device is measured. The level measurement is verified.

Aspects of the example method, which can be combined with the example method alone or in combination with other aspects, include that following. Verifying the measurement includes measuring a differential pressure between a third and a fourth valve separated by a vertical distance. The third valve and the fourth valve each define a respective flow passage fluidically connected to the measurement chamber.

Aspects of the example method, which can be combined with the example method alone or in combination with other aspects, include that following. Verifying the measurement includes comparing the measurement with the designated amount of calibration fluid.

An example of the subject matter described within this disclosure is a level measurement system with the following features. A vertical tubular defines a measurement chamber. A first valve is nearer an upper end of the vertical tubular than a lower end of the vertical tubular. The first valve defines a first actuable passage fluidically connected to the measuring chamber and a pressure vessel. A second valve is nearer the lower end of the vertical tubular than the upper end of the vertical tubular. The second valve defines a second actuable passage fluidically connected to the measuring chamber and a pressure vessel. A third valve is vertically aligned with the first valve. The third valve is on an opposite side of the vertical tubular from the first valve. The third valve defines a third actuable passage fluidically connected to the measuring chamber. A fourth valve is vertically aligned with the second valve. The second valve is on an opposite side of the vertical tubular from the first valve. The fourth valve defines a fourth actuable passage fluidically connected to the measuring chamber. A first flange is at an upper end of the vertical tubular. A second flange is at a lower end of the vertical tubular. A level sensor is coupled to the measuring chamber.

Aspects of the example level measurement system, which can be combined with the example level measurement system alone or in combination with other aspects, include that following. The level sensor includes a guided wave radar or laser attached to the first flange.

Aspects of the example level measurement system, which can be combined with the example level measurement system alone or in combination with other aspects, include that following. The level sensor includes a differential pressure sensor fluidically connected to the third passage and the fourth passage.

Aspects of the example level measurement system, which can be combined with the example level measurement system alone or in combination with other aspects, include that following. The differential pressure sensor includes two discrete pressure sensors.

Aspects of the example level measurement system, which can be combined with the example level measurement system alone or in combination with other aspects, include that following. The vertical tubular includes super duplex.

Aspects of the example level measurement system, which can be combined with the example level measurement system alone or in combination with other aspects, include that following. The second flange is blinded.

Particular implementations of the subject matter described in this specification can be implemented so as to realize one or more of the following advantages. The subject matter described herein allows for accurate level measurements to be taken in volatile process systems. Similarly, the subject matter described herein allows for level sensors to be calibrated while online.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Throughout commercial processing plants, the level in reaction beds is critical for efficient reactions. Knowing the level more accurately allows better process control and more efficient reactions/production. In volatile processes or vessels with interference (slats, trays, reaction beds) levels are difficult to accurately measure. In many instances, the fluid level must essentially be "guessed".

This disclosure describes a level measurement device with a vertical tubular defining a measurement chamber. The tubular includes four valves: two near an upper end of the tubular and two near the lower end of the tubular. The valves define fluid passages into the measurement chamber. Additionally, there is a flange at both the upper and lower end of the tubular. The valves can be used to connect to a volatile process and various sensors, as can the flanges. Procedures to use the level measurement device within a volatile system are described herein.

Figure 1:
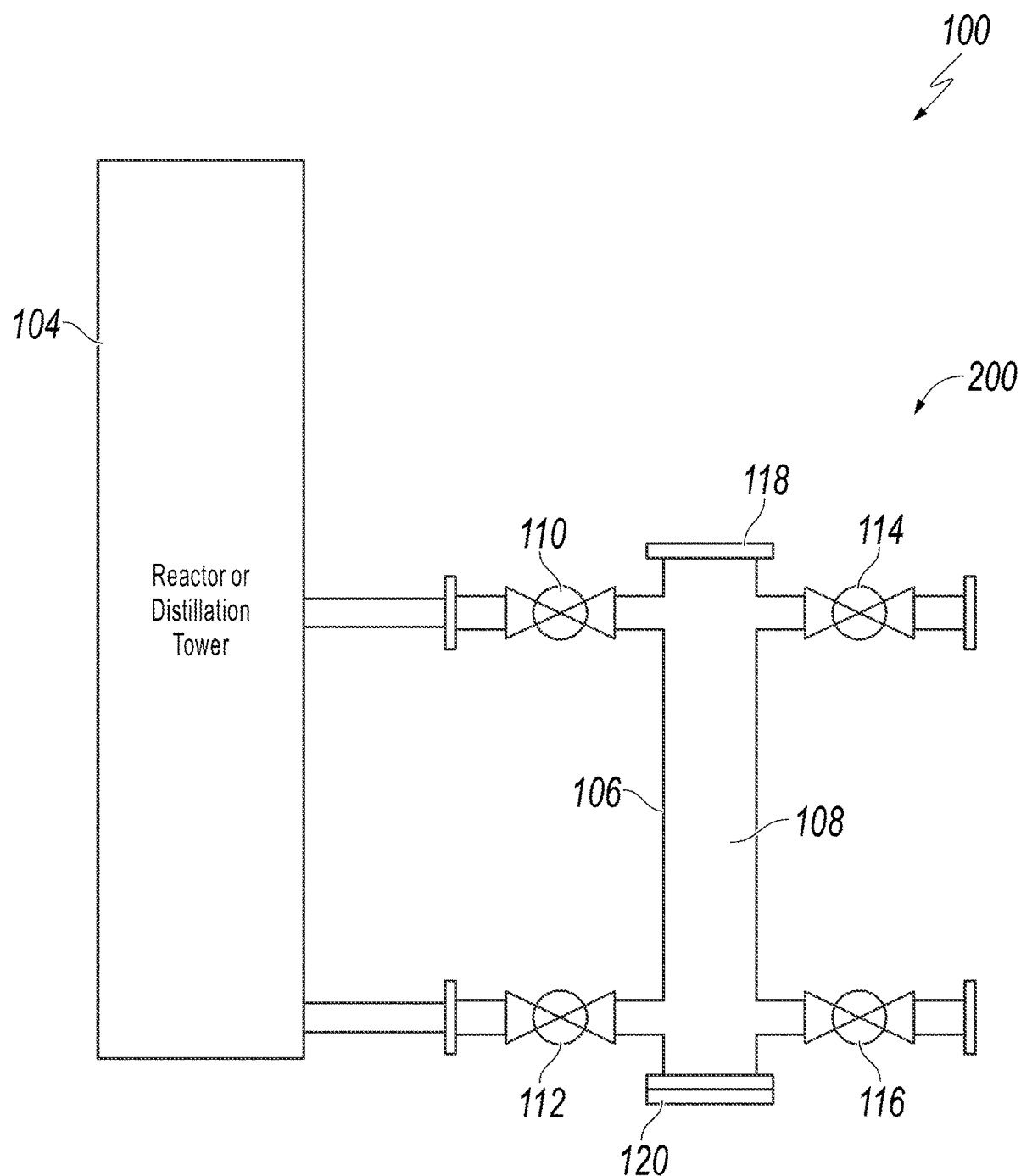
FIG. 1 is a schematic diagram of a volatile processing system.

FIG. 1 is a schematic diagram of a volatile processing system 100. The volatile processing system 100 includes a level measurement device 200 coupled to a pressure vessel 104. The pressure vessel 104 can be any kind of pressurized process vessel for example, a reactor or a distillation tower. The measurement device 200 includes a vertical tubular 106 defining a vertical measurement chamber 108. The vertical measurement chamber 108 is a controlled volume that can be used to measure a level within the pressure vessel 104. Nearer an upper end of the vertical tubular 106 than a lower end of the vertical tubular 106 is a first valve 110. That is, a first valve 110 is near an upper end of the vertical tubular 106. The first valve 110 defines a first actuable passage fluidically connecting the vertical measurement chamber 108 to the pressure vessel 104. A second valve 112 is nearer the lower end of the vertical tubular 106 than the upper end of the vertical tubular. That is, the second valve 112 is near the lower end of the vertical tubular 106, the second valve defining a second actuable passage fluidically connecting the pressure vessel 104 to the vertical measurement chamber 108. The vertical distance between the first valve 110 and the second valve 112 is a known value that can be used in level calculations.

A third valve 114 is vertically aligned (within standard manufacturing tolerances) with the first valve 110. That is, the third valve 114 is level with the first valve 110. In some implementations, the third valve 114 is on an opposite side of the vertical tubular 106 from the first valve 110. The third valve 114 defines a third actuable passage fluidically connected to the vertical measurement chamber 108. A fourth valve 116 is vertically aligned with the second valve 112. That is, the third valve 114 is level with the fourth valve 116. In some implementations, the fourth valve 116 is on the opposite side of the vertical tubular from the second valve 112. The fourth valve 116 defines a fourth actuable passage fluidically connected to the vertical measurement chamber 108.

The previously described valves can be attached to the vertical tubular 106 by bolted flanges, welded flanges, clamped flanges, threaded flanges, or any other type of flange suitable for the service. In some implementations, different valves may be connected or attached to the vertical tubular in different ways. The valves themselves can include any type of valve suitable for the service and that can sufficiently isolate the vertical tubular 106 from the pressure vessel 104, the outside environment, or both. For example, the valves can include ball valves, gate valves, needle valves, or glove valves. In general, any valve suitable for the service, (based on temperatures, corrosion resistance, and temperature tolerance) can be used so long as sufficient sealing is provided.

At an upper end of the vertical tubular is a first upper flange 118. In some implementations, the first flange can be blinded. In some implementations, the second flange can be connected to instrumentation. At a lower end of the vertical tubular is a second flange 120. While primarily described and illustrated as being blinded, that is, being sealed, the second flange 120 can be connected to additional instrumentation without departing from this disclosure.

As volatile chemicals can be very corrosive or caustic, in some implementations, the vertical tubular 106 includes a corrosion resistant material or alloy, such as super duplex. Such a corrosion resistant material can include a coating on the interior surface of the vertical tubular, or the entire tubular itself can be constructed of such a material.

Additional features can be added to the previously described measurement device 200 depending upon the surface. For example, heaters, pressure relief systems, and various sensors beyond those described within this disclosure can be used without departing from this disclosure.

Figure 2:
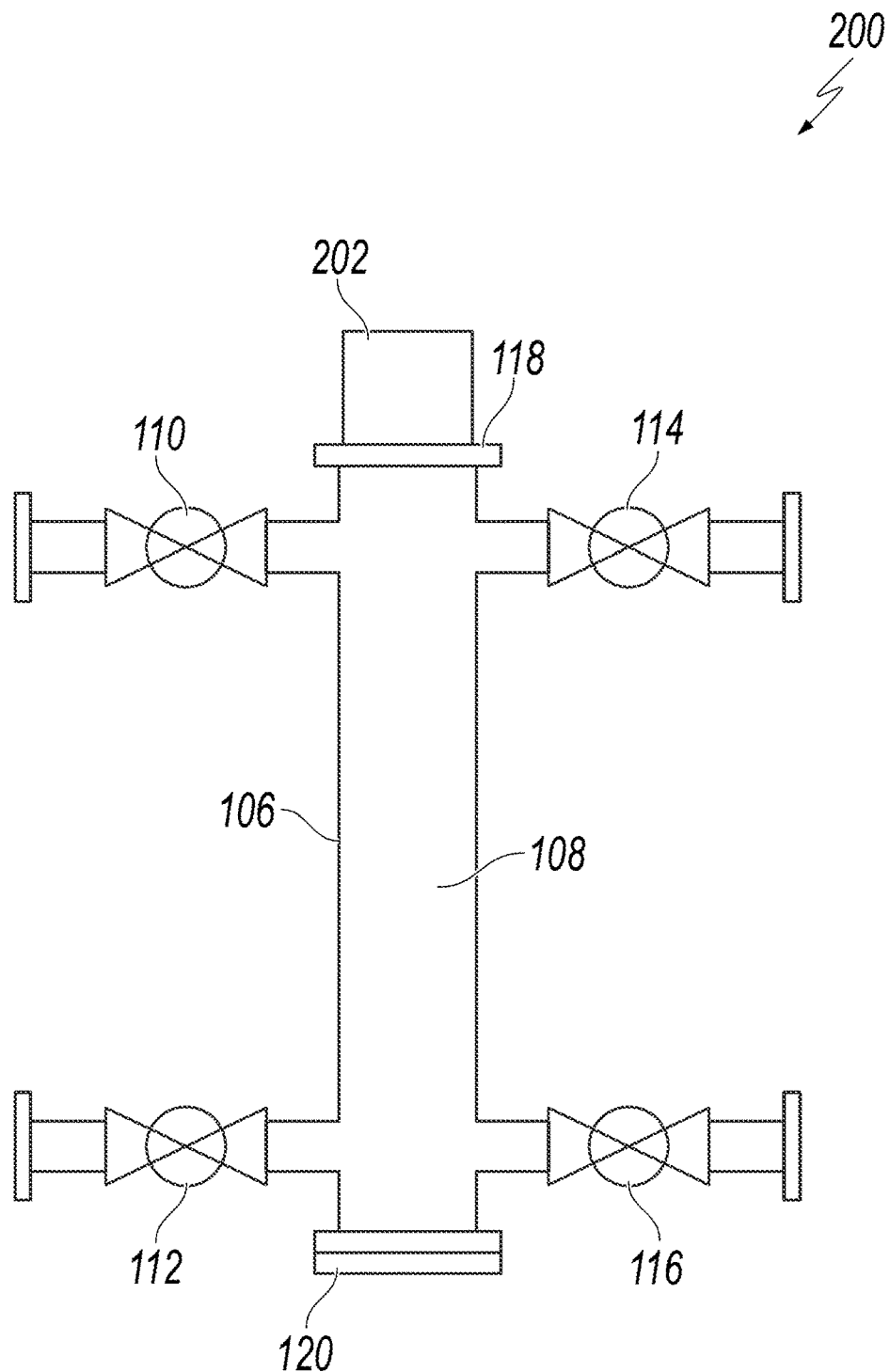
FIG. 2 is a schematic diagram of an example measurement tubular.

FIG. 2 is a schematic diagram of the example measurement device 200. Atop the measurement (vertical) tubular 106 itself is a level sensor 202 coupled to the vertical measurement chamber 108. In some implementations, the level sensor includes a guided wave radar or range-finding laser attached to the first upper flange 118. In some implementations, the second (lower) flange is blinded, or sealed. While primarily illustrated and described as having the level sensor 202 mounted to the first upper flange 118 and the lower flange being blinded, other arrangements are possible without departing from this disclosure. For example, the first upper flange 118 or the second flange 120 can be blinded without departing from this disclosure.

Figure 3A:
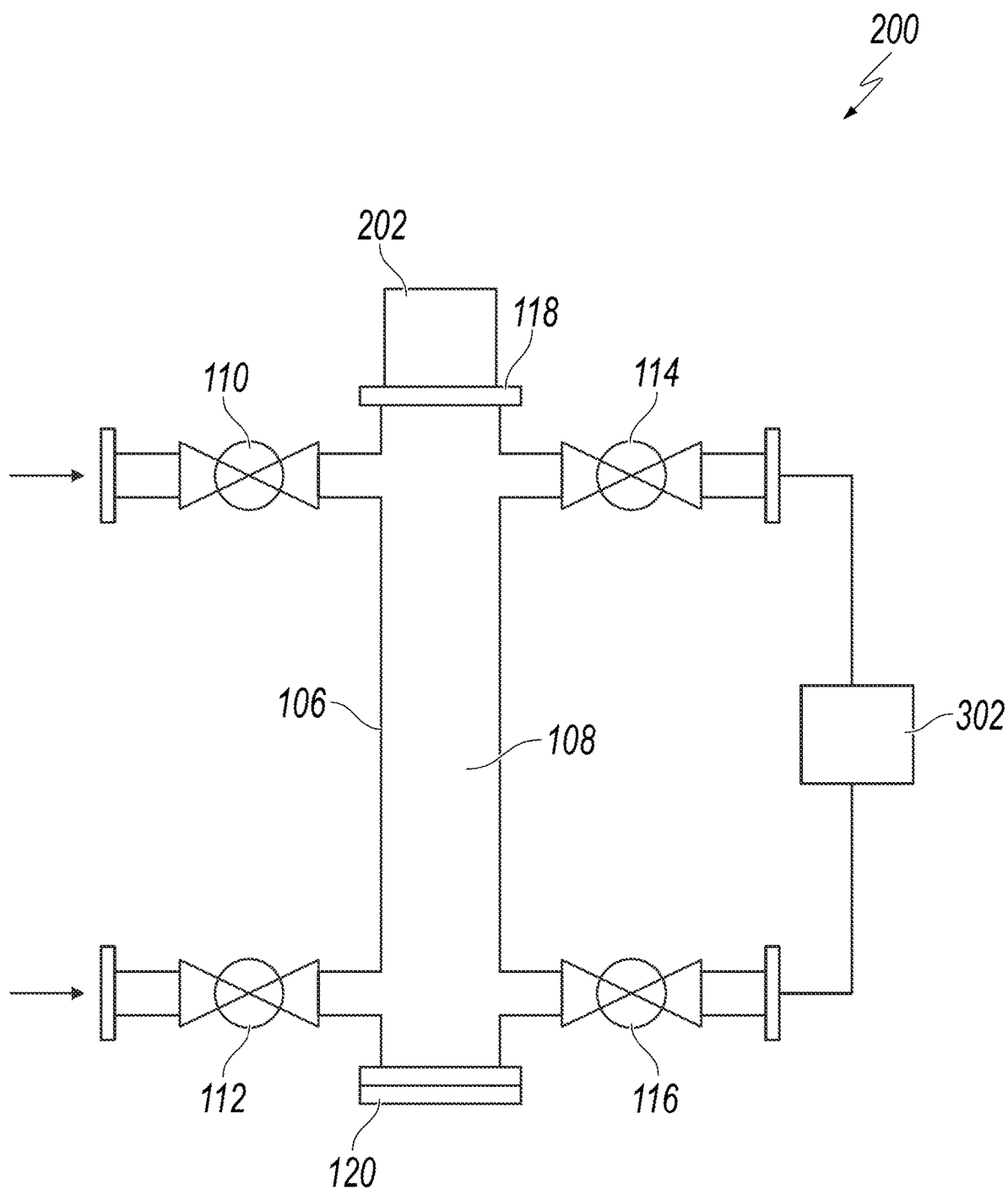
FIGS. 3A-3B are schematic diagrams of example calibration arrangements for the measurement tubular.
Figure 3B:
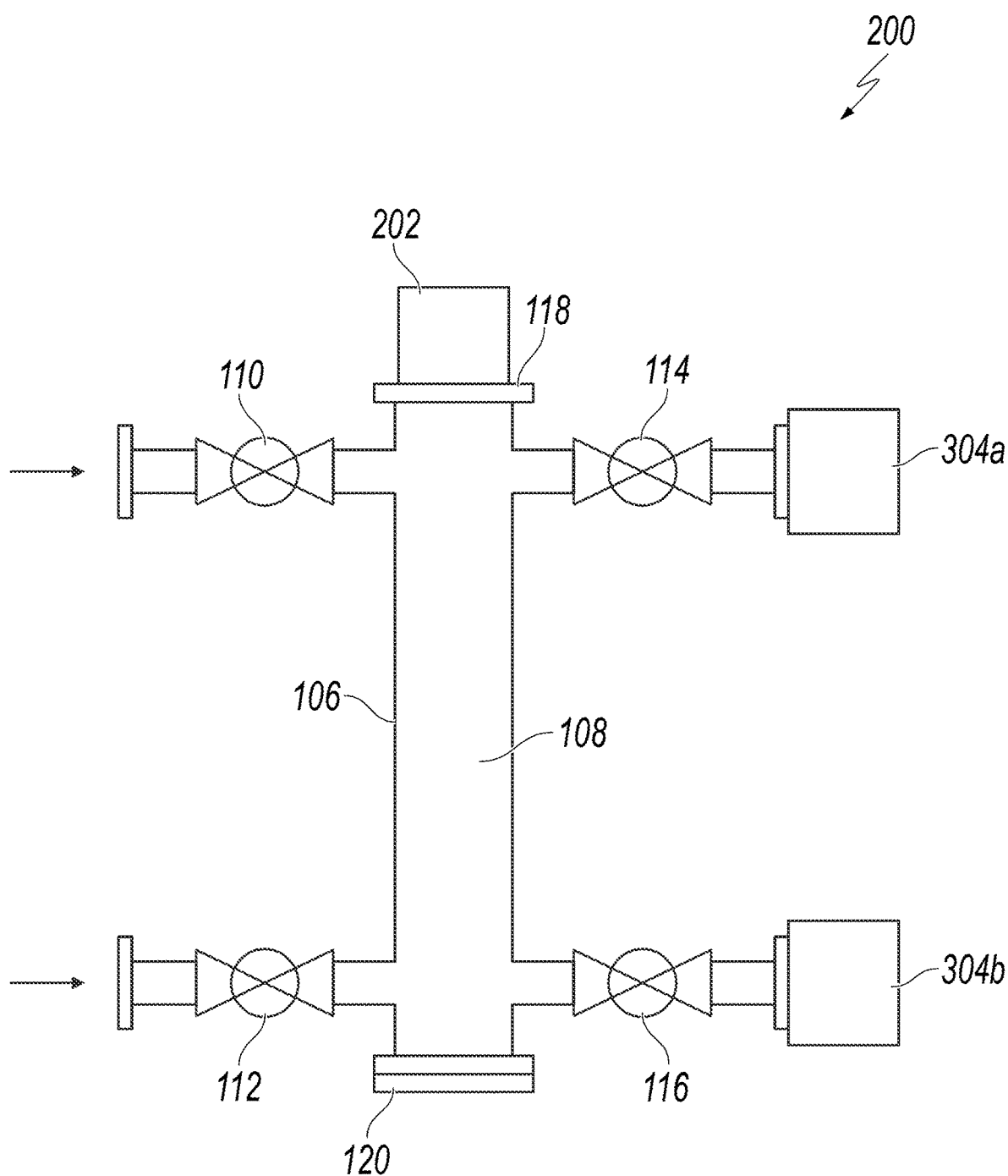

FIGS. 3A-3B are schematic diagrams of example calibration arrangements for the measurement (vertical) tubular 106. In FIG. 3A, a differential pressure sensor 302 is fluidically connected to the third valve 114 and the fourth valve 116. The differential pressure sensor is used to measure a pressure differential between the valves when the valves are in the open position. FIG. 3B illustrates an implementation in which a first discreet pressure sensor 304a is fluidically connected to the third valve 114 and a second discrete pressure sensor 304b is fluidically connected to the fourth valve 116. In such an implementation, the discrete sensors measure an absolute or gauge pressure, then a pressure differential is calculated.

Figure 4:
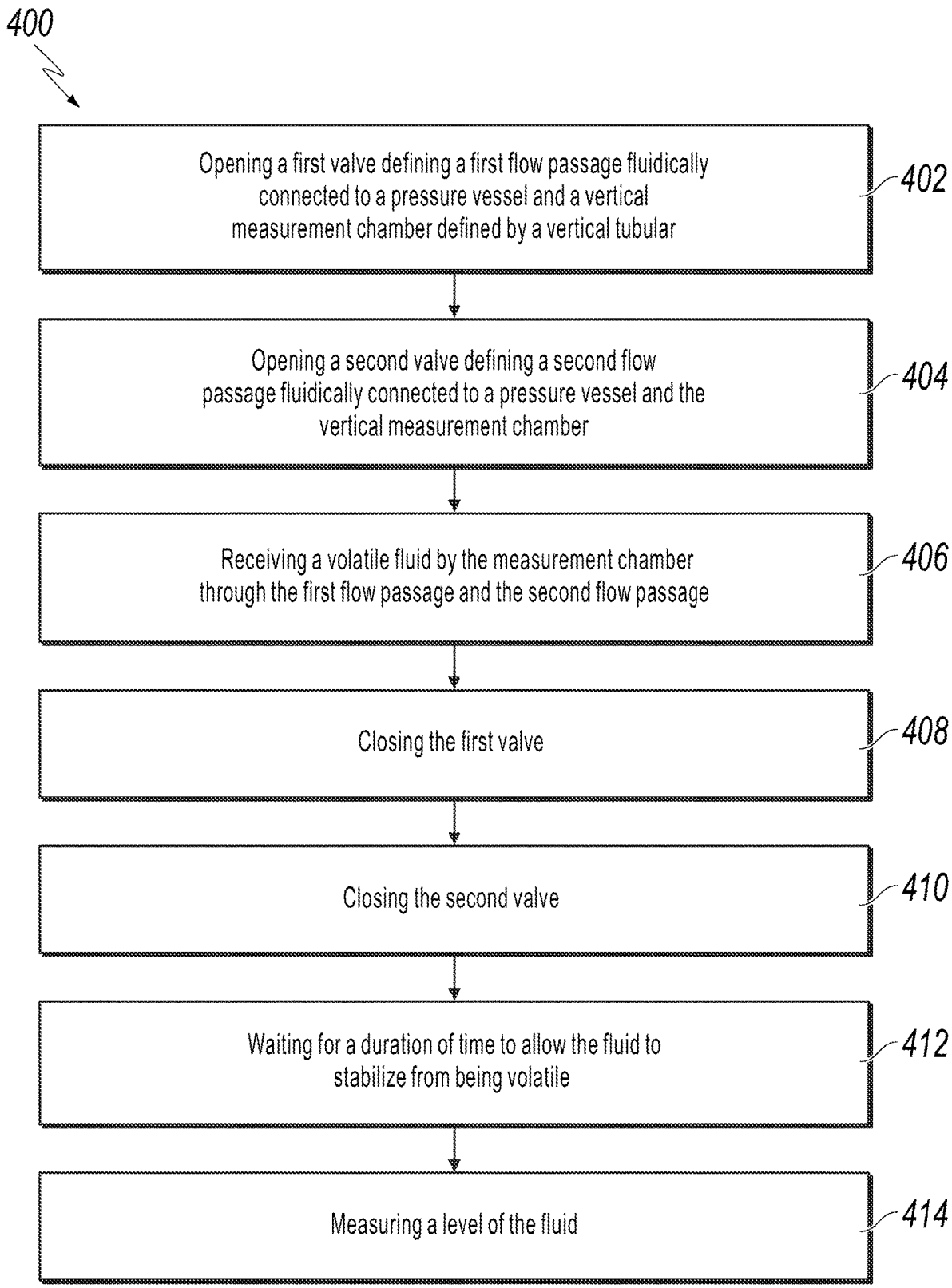
FIG. 4 is a flowchart of an example method that can be used with aspects of this disclosure.

FIG. 4 is a flowchart of an example method 400 that can be used with aspects of this disclosure. At 402, the first valve 110, defining the first flow passage fluidically connected to the pressure vessel 104 and the vertical measurement chamber 108 defined by the vertical tubular 106, is opened. At 404, the second valve 112, defining the second flow passage fluidically connected to the pressure vessel 104 and the vertical measurement chamber 108, is opened. The opening of the first valve 110 and the second valve 112 allow, at 406, for a volatile fluid to be received by the vertical measurement chamber 108 through the first flow passage and the second flow passage. Once the fluid is received, at 408, the first valve 110 is close, and at 410, the second valve 112 is closed. At 412, a duration of time passes to allow the fluid to stabilize from being volatile. For example, the duration of time can be at least 10 minutes. Once the fluid has stabilized, at 414, a level of the fluid is measured.

Prior to opening the first valve or the second valve, a level measurement device (for example, level sensor 202) is attached to an upper end of the vertical tubular 106, such as a guided wave radar or laser measurement device to an upper end of the vertical tubular 106 by the first upper flange 118. Generally, such devices are in need of calibration after installation and prior to use. Such a calibration method is subsequently described. The third valve 114, defining the third flow passage fluidically connected to the vertical measurement chamber 108, is opened. The fourth valve, defining the fourth flow passage fluidically connected to the vertical measurement chamber 108, is opened. A designated amount of calibration fluid is received by the vertical measurement chamber 108. In some implementations, the calibration fluid is received from the third flow passage or the fourth flow passage. In some implementations, the calibration fluid is received from the first or second flow passages. In some implementations, the calibration fluid is received by the first upper flange 118 or the second flange 120. Once the calibration fluid is received, a level of the fluid is measured with the guided wave radar or laser measurement device. The determined level measurement is then verified. The level measurement can be verified in a variety of ways, not just during calibration, but during operation as well. In some instances, verifying the measurement includes measuring a differential pressure between the third valve 114 and the fourth valve 116, which are separated by a vertical distance. This vertical distance allows a static head within the vertical measurement chamber 108 to be measured. The differential pressure corresponds to a level, which can then be compared to the guided wave radar or laser measurement to determine accuracy. In some instances, the calibration fluid has a designated amount. As such, the known volume can be calculated to produce a level, which can then be compared to the measured level produced by the guided wave radar or laser measurement device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single software product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A level measurement device comprising:
   a vertical tubular defining a measurement chamber;
   a first valve coupled in a first branch that extends orthogonally away from the vertical tubular in a first direction nearer an upper end of the vertical tubular than a lower end of the vertical tubular, the first valve comprising a first actuable passage fluidically connected to the measuring chamber through the first branch;
   a second valve coupled in a second branch that extends orthogonally away from the vertical tubular in the first direction nearer the lower end of the vertical tubular than the upper end of the vertical tubular, the second valve comprising a second actuable passage fluidically connected to the measuring chamber through the second branch;
   a third valve vertically aligned with the first valve, the third valve being on an opposite side of the vertical tubular from the first valve and coupled in a third branch that extends orthogonally away from the vertical tubular in a second direction opposite the first direction, the third valve comprising a third actuable passage fluidically connected to the measuring chamber through the third branch;
   a fourth valve vertically aligned with the second valve, the fourth valve being on an opposite side of the vertical tubular from the second valve and coupled in a fourth branch that extends orthogonally away from the vertical tubular in the second direction, the fourth valve comprising a fourth actuable passage fluidically connected to the measuring chamber through the fourth branch;
   a first flange at an upper end of the vertical tubular;
   a second, blinded flange at a lower end of the vertical tubular;
   a level measurement device mounted to the first flange; and
   a differential pressure device coupled between the third and fourth valves.

2. The measurement device of claim 1, wherein the level measuring device comprises a guided wave radar device.

3. The measurement device of claim 1, wherein the level measuring device comprises a laser measurement device.

4. The measurement device of claim 1, wherein the differential pressure device comprises two discrete pressure sensors that comprise a first discrete pressure sensor fluidly coupled to the third valve and a second discrete pressure sensor fluidly coupled to the fourth valve.

5. The measurement device of claim 1, wherein the differential pressure device comprises a differential pressure sensor fluidly connected between the third and fourth valves.

6. The measurement device of claim 1, wherein the differential pressure device coupled between the third and fourth valves is configured to measure a pressure differential between the third and fourth valves when the third and fourth valves are each in an open position.

7. The measurement device of claim 1, wherein the vertical tubular comprises a corrosion resistant alloy.

8. The measurement device of claim 7, wherein the corrosion resistant alloy comprises super duplex.

9. The measurement device of claim 7, wherein the corrosion resistant alloy is a coating formed on an interior surface of the vertical tubular.

10. The measurement device of claim 7, wherein the vertical tubular is made of the corrosion resistant alloy.

11. A method, comprising:
    identifying a level measurement device, comprising:
       a vertical tubular defining a measurement chamber;
       a first valve coupled in a first branch that extends orthogonally away from the vertical tubular in a first direction nearer an upper end of the vertical tubular than a lower end of the vertical tubular, the first valve comprising a first actuable passage fluidically connected to the measuring chamber through the first branch;
       a second valve coupled in a second branch that extends orthogonally away from the vertical tubular in the first direction nearer the lower end of the vertical tubular than the upper end of the vertical tubular, the second valve comprising a second actuable passage fluidically connected to the measuring chamber through the second branch;
       a third valve vertically aligned with the first valve, the third valve being on an opposite side of the vertical tubular from the first valve and coupled in a third branch that extends orthogonally away from the vertical tubular in a second direction opposite the first direction, the third valve comprising a third actuable passage fluidically connected to the measuring chamber through the third branch;
       a fourth valve vertically aligned with the second valve, the fourth valve being on an opposite side of the vertical tubular from the second valve and coupled in a fourth branch that extends orthogonally away from the vertical tubular in the second direction, the fourth valve comprising a fourth actuable passage fluidically connected to the measuring chamber through the fourth branch;
       a first flange at an upper end of the vertical tubular;
       a second, blinded flange at a lower end of the vertical tubular;
       a level measurement device mounted to the first flange; and
       a differential pressure device coupled between the third and fourth valves;
    opening the first valve to fluidly connect the measurement chamber to a pressure vessel through the first branch;
    opening the second valve to fluidly connect the measurement chamber to the pressure vessel through the second branch;
    receiving a fluid into the measurement chamber from the pressure vessel through the first branch and the second branch;
    closing the first valve;
    closing the second valve;
    waiting for a duration of time to allow the fluid to stabilize from being volatile; and
    measuring a level of the fluid with the level measurement device.

12. The method of claim 11, wherein the duration of time is 10 minutes.

13. The method of claim 11, comprising:
prior to opening the first valve, attaching a guided wave radar as the level measurement device to the first flange.

14. The method of claim 13, wherein measuring the level of the fluid with the level measurement device comprises measuring the level with the guided wave radar.

15. The method of claim 11, comprising:
prior to opening the first valve, attaching a laser measurement device as the level measurement device to the first flange.

16. The method of claim 15, wherein measuring the level of the fluid with the level measurement device comprises measuring the level with the laser measurement device.

17. The method of claim 11, comprising calibrating the level measurement device on the first flange.

18. The method of claim 17, wherein the step of calibrating occurs prior to receiving the fluid into the measurement chamber from the pressure vessel through the first branch and the second branch but after coupling the level measurement device to the first flange.

19. The method of claim 17, wherein calibrating comprises:
opening at least one of the third valve of the fourth valve;
receiving, into the measurement chamber, a designated volume of calibration fluid from at least one of the third branch or the fourth branch;
measuring a level of the calibration fluid with the level measurement device; and
verifying the level of the calibration fluid measured by the level measurement device with the designated volume of calibration fluid.

20. The method of claim 19, wherein verifying the level of the calibration fluid measured by the level measurement device with the designated volume of calibration fluid comprises:
measuring, with the differential pressure device, a differential pressure between the third and the fourth valve.

* * * * *

UNITED STATES PATENT AND TRADEMARK OFFICE
CERTIFICATE OF CORRECTION

| | | |
|---|---|---|
| PATENT NO. | : 12,130,166 B2 | Page 1 of 1 |
| APPLICATION NO. | : 18/435489 | |
| DATED | : October 29, 2024 | |
| INVENTOR(S) | : Nicholas J. Pengilly and Zied Soua | |

It is certified that error appears in the above-identified patent and that said Letters Patent is hereby corrected as shown below:

On the Title Page

Column 2, (57) Abstract, Line 5, please replace "is valve" with -- valve is --.

Signed and Sealed this
Fourth Day of March, 2025

Coke Morgan Stewart
*Acting Director of the United States Patent and Trademark Office*